Jan. 21, 1941.　　　　W. M. SMITH　　　　2,229,529

STEAM TRAP

Filed Sept. 14, 1938

Inventor
William M. Smith
By Barrett & Truman
Attorneys

Patented Jan. 21, 1941

2,229,529

UNITED STATES PATENT OFFICE 2,229,529

STEAM TRAP

William M. Smith, Chicago, Ill., assignor to Vapor Car Heating Company, Inc., Chicago, Ill., a corporation of New York Application September 14, 1938, Serial No. 229,879

7 Claims. (Cl. 236—56)

This invention is directed to new and useful improvements in steam trap of the type positioned at the exhaust end of a steam heating system outside of the space being heated and adapted to automatically close to prevent the escape of live steam from the system and adapted also to automatically open to allow the steam condensate to escape from the system when the temperature falls below that of the steam, or substantially 212° F.

The usual type of steam trap comprises a bellows valve adapted to expand at 212° F. to seat the valve. It is obvious that it is inefficient and undesirable to allow steam to escape from the system in any substantial amounts and such valve positioned at the exhaust end of the system will automatically close when steam is passing through the valve to hold it in the system but when such steam condenses and the temperature drops below 212° F. the valve will automatically open and allow the moisture to escape from the system.

In steam systems operated in extremely cold temperatures it has frequently happened that the steam injected into the system rapidly cools to such an extent that when it reaches the steam trap positioned out-of-doors at the exhaust end of the system it is in the form of water which freezes and thus causes damage and interferes with the operation of the system.

The primary object of this invention is to provide a novel form of steam trap that will be automatically kept above freezing temperature at all times.

A further object of this invention is to provide a steam trap that will not be frozen up even though operated at severe temperatures but will yet permit the condensing steam to escape from the system.

Still a further object is to provide an automatically non-freezable steam trap for the exhaust end of a heating system that is simple in construction and positive in action.

Figure 1:
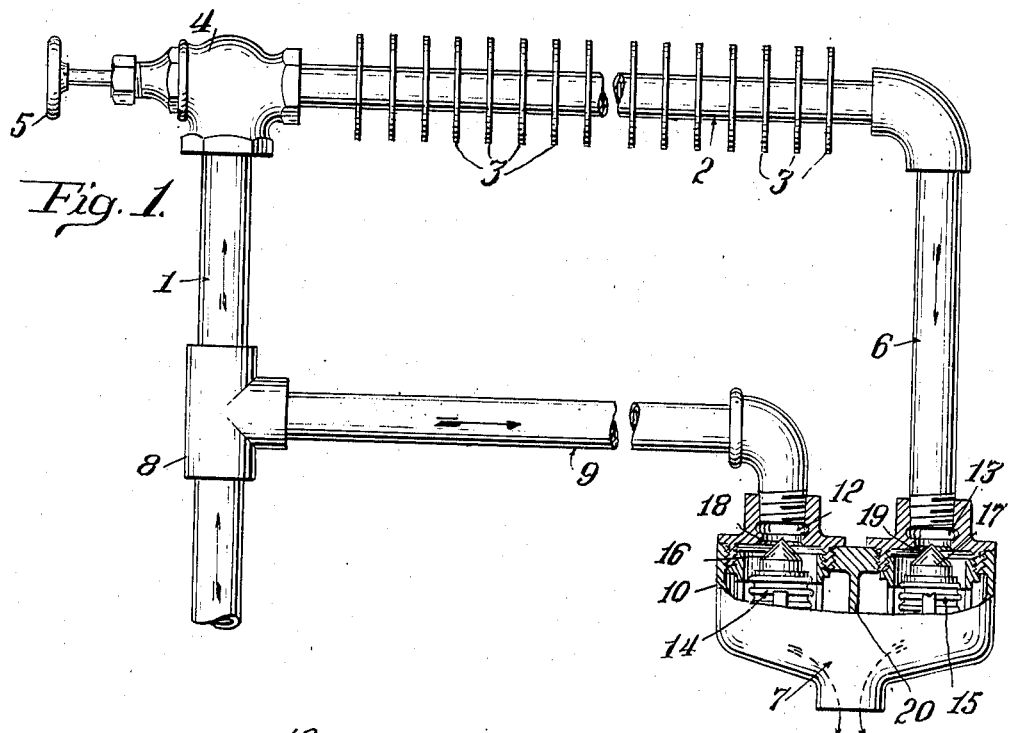

Further objects and advantages of this invention will be apparent from an examination of the following detailed description and drawings in which Fig. 1 is a diagrammatic view of a steam heating system showing a steam trap embodying my invention operably connected therewith.

Figure 2:
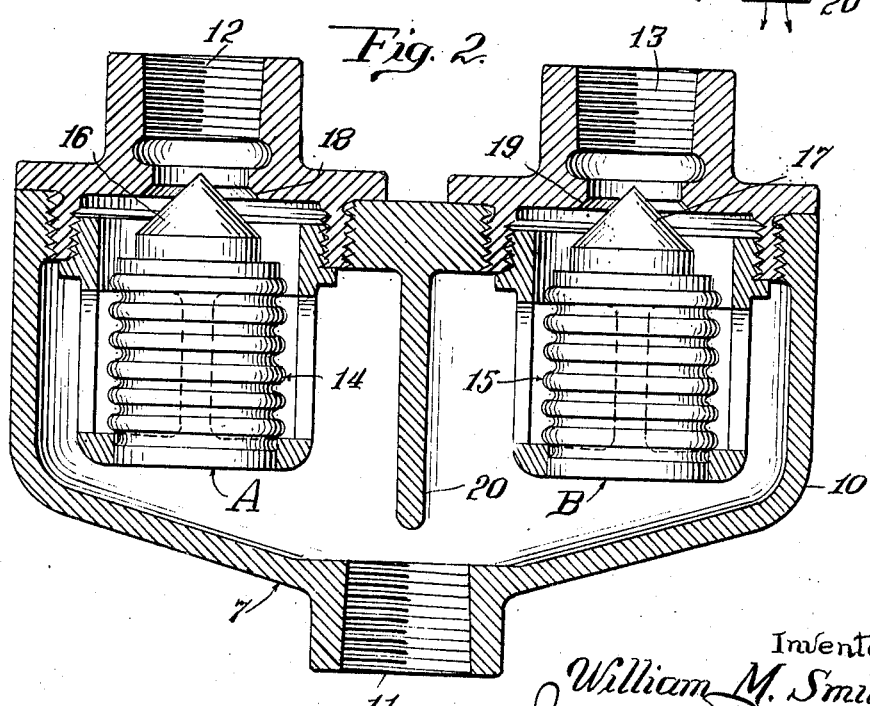

Fig. 2 is an enlarged sectional view of the steam trap shown in Fig. 1.

In detail 1 indicates a supply pipe leading from a source of steam supply (not shown) to the heating system, 2 a heat radiating means of any desired type positioned within the spaces to be heated, and provided for purposes of illustration with radiating fins 3, 4 is a manually operable valve for controlling the steam supply to the radiating means and operable by the handle 5, and 6 is the exhaust pipe at the end of the system which leads to and is operably connected with the improved steam trap 7 embodying the invention herein contained. A T-fitting 8 is positioned in supply pipe 1 and a by-pass pipe 9 leads from the fitting 8 to the trap 7.

The steam trap 7 comprises an encasing assembly 10 forming a chamber provided with an outlet opening 11 and two inlet openings 12 and 13. The by-pass pipe 9 leads to the opening 12 in the trap and the exhaust pipe 6 leads to the opening 13. Outlet 11 is at all times open to the atmosphere.

Operably mounted directly beneath the inlet openings 12 and 13 are bellows valves A and B each comprising expansible members 14 and 15 respectively and valve members 16 and 17 respectively. The members 14 and 15 contain gas or liquid which will expand when subjected to predetermined temperatures to seat the valves 16 and 17 respectively against the valve seats 18 and 19 to close the openings 12 and 13.

A baffle or partition 20 extends between the two bellows valve members A and B to form substantially two compartments within the trap but permitting communication therebetween beneath the partition which terminates short of the floor of the trap. The specific details of construction of the trap are unimportant, the construction shown in the drawings being merely illustrative.

As is well known in the art, bellows valves of the type herein shown can be made to operate at any predetermined temperature depending upon the kind of gas or liquid placed within the bellows structure. Preferably the bellows valve A is constructed to expand at substantially 100° F. and bellows valve B at 212° F. In other words, valve A will expand to close inlet 12 when the temperature surrounding valve A is more than 100° F. and valve B will expand to close inlet 13 when the temperature surrounding it is more than 212° F. With no steam in the system both valves will be open.

In operation: Steam being admitted to the heating system through pipe 1 will follow the direction of the arrows through by-pass line 9 to the trap 7 and through the radiating means 2 and exhaust pipe 6 to the trap 7. The inlet 12 of the trap being normally open steam will enter the trap surrounding valve A rapidly raising the temperature to above 100° F. causing the bellows valve A to expand to close inlet 12. Assuming the temperature to be mild, pipe 6 will also contain live steam which will be admitted to the trap through inlet 13 rapidly raising the temperature surrounding bellows valve B to above 212° F. thus causing valve B to expand and close inlet 13. As the steam in pipe 6 and in the trap condenses the temperature surrounding valve B drops below 212° F. and the valve will contract to normal open position allowing the moisture from the condensed steam to enter the trap and escape through outlet 11.

It can thus be seen that in the normal operation of the system in the absence of extreme cold outside temperature inlet 12 of the trap will be closed inasmuch as the temperature surrounding the bellows valve 14 will at all times be above 100° F. and the inlet 13 of the trap will be open so long as the steam in the exhaust end of the system is condensing to permit the escape of the moisture caused by the condensing steam and will be closed whenever the bellows valve B is subjected to the heat of steam.

Assuming operation in extremely cold outside temperatures the heat from the steam in the system will be rapidly dissipated by radiation from the radiating means and the steam will rapidly condense and the water and moisture therefrom will be rapidly cooled so that the water within the steam trap 7 which is subjected to the severe outside temperatures, will, in the absence of the invention herein described, become frozen. However when the temperature within the space surrounding bellows valve A drops below 100° F. the valve will contract to normal position to open inlet 12 and admit steam from by-pass 9 which is connected directly to the source of steam. The steam so admitted to the trap will maintain the temperature therein well above the freezing point and the freezing danger is thus eliminated. The baffle 20 will prevent the steam so admitted from raising the temperature surrounding valve B to a sufficient degree to close inlet 13. Under these conditions inlet 13 should remain open to allow the cold condensate in pipe 6 to escape through the trap.

As soon as the temperature within the trap is raised above 100° F. by means of the by-passed steam, bellows valve A will expand to close inlet 12 and shut off the supply. Thus valve A will continue to operate to admit sufficient steam to maintain an above freezing temperature within the trap so long as the exhaust end of the system remains cold.

When the space to be heated has become warmed the loss of heat from the steam will be decreased and steam will again fill exhaust pipe 6 and will escape through trap 7. At this point the steam from pipe 6 will again maintain the temperature within the trap above 100° F. and this valve B will again operate as above set forth.

The system shown in Fig. 1 is merely illustrative, it being understood that the radiating means generally are in the form of a plurality of radiating units positioned throughout the spaces to be heated.

The given operating temperatures of the bellows valves are merely cited as preferable, it being clear that the respective operating temperatures of these bellows valves may be other than given without departing from this invention.

The specific construction of the trap as shown and the relative positions of the two bellows valves are not critical to the operation of the steam trap embodying this invention.

I claim:

1. In a steam heating system, a source of steam, radiating means positioned in the space to be heated and joined to said source of steam, a steam trap, a pipe leading from the radiating means to the steam trap, a pipe leading from the source of steam directly to the steam trap, an automatically operable temperature responsive valve constructed so as to prevent the admission of steam to the trap from the radiating means and an automatically operable temperature responsive valve constructed so as to admit steam to the trap from the steam source to maintain an above freezing temperature within the trap under all conditions.

2. In a steam heating system, a source of steam, radiating means positioned in the space to be heated and joined to said source of steam, a steam trap, a pipe leading from the radiating means to the steam trap, a pipe leading directly from the source of steam to the steam trap, an automatically operable valve positioned within the trap to control the admission of fluid passing from the radiating means to the trap and an automatically operable temperature responsive valve positioned within the trap to control the steam passing into the trap from its source, said second valve being provided with temperature responsive means that will cause said valve to open to admit steam to the trap directly from the steam source whenever the heat from the fluid passing from the radiating means into the trap is insufficient to maintain a predetermined temperature therein.

3. In a steam heating system, a source of steam, radiating means positioned in the space to be heated and joined to said source of steam, a steam trap, a pipe leading from the radiating means to the steam trap, a pipe leading directly from the source of steam to the steam trap, a bellows valve positioned within the trap provided with an expansible medium that will expand at substantially 212° F. to cause said valve to shut off communication between the pipe leading from the radiating means and the trap and a bellows valve positioned within the trap provided with a contractible medium that will contract at a predetermined temperature below 212° F. to unseat the valve so as to open communication between the pipe leading from the source of steam and the trap.

4. A non-freezable steam trap for use in a steam heating system comprising a chamber provided with a steam inlet, a condensate inlet and an outlet, a valve controlling the steam inlet, temperature responsive means in said chamber for controlling said valve so that the valve will automatically close the steam inlet when the temperature in the chamber is above a predetermined degree and will open said inlet when the temperature in the chamber drops below said temperature, a valve controlling the condensate inlet, temperature responsive means in said chamber for controlling said valve so that the valve will automatically close the condensate inlet when the temperature in the chamber is that of steam and will open said inlet when the chamber temperature drops below that of steam.

5. A non-freezable steam trap for use in a steam heating system comprising a chamber provided with a steam inlet port, a condensate inlet port and an exhaust port, a valve for said steam inlet port, temperature responsive means in said chamber for controlling said valve so that the valve will open said steam inlet port when the temperature within the chamber falls below a predetermined degree and will close said port at all other times, a valve for one of said other ports and temperature responsive means in the chamber controlling said second valve so that said second valve will close said other port when the temperature in the chamber is substantially that of steam.

6. In a steam heating system, a steam trap positioned at the exhaust end of the system and comprising a chamber provided with two inlets and an exhaust outlet, a pipe leading from the exhaust end of the system to one inlet, a pipe leading directly from the source of steam supply to the other inlet, a valve controlling the inlet connected to the exhaust end of the system, temperature responsive means in the chamber controlling said valve and constructed to expand in the presence of steam to close said valve and contract at a lower temperature to open said valve, a second valve controlling the inlet connected to the pipe leading from the steam source, temperature responsive means in the chamber for controlling said second valve and constructed to expand at a predetermined temperature below that of steam to close said second valve and to contract at a lower temperature to open said valve whereby steam is admitted to said chamber when the temperature therein falls below said predetermined degree.

7. A non-freezable steam trap comprising a chamber provided with a steam inlet port, a condensate inlet port and an exhaust port, automatic and independently operable valves controlling two of said ports, one of said valves provided with temperature responsive means within said chamber that will unseat said valve at a predetermined temperature to open the steam inlet port, the other valve provided with steam responsive means within said chamber that will cause said valve to close one of said other ports in the presence of steam.

WILLIAM M. SMITH.